United States Patent
Chien et al.

(10) Patent No.: US 9,702,536 B2
(45) Date of Patent: Jul. 11, 2017

(54) EXPLOSION-PROOF LAMP CABLE GLAND (71) Applicant: Li-Hong Science & Technology Co., Ltd., Kaohsiung (TW)

(72) Inventors: Ming-Tien Chien, Kaohsiung (TW); Ching-Yuan Juan, Kaohsiung (TW); Han-Wen Chang, Kaohsiung (TW); Cheng-Lung Juan, Kaohsiung (TW)

(73) Assignee: LI-HONG SCIENCE & TECHNOLOGY CO., LTD., Kaohsiung (TW)

( * ) Notice: Subject to any disclaimer, the term of this patent is extended or adjusted under 35 U.S.C. 154(b) by 411 days.

(21) Appl. No.: 14/262,292

(22) Filed: Apr. 25, 2014

(65) Prior Publication Data

US 2015/0308672 A1    Oct. 29, 2015

(51) Int. Cl.
| | |
|---|---|
| *F21V 25/12* | (2006.01) |
| *F21V 23/00* | (2015.01) |
| *F21V 31/00* | (2006.01) |
| *H02G 15/013* | (2006.01) |

(52) U.S. Cl.
CPC ............ *F21V 25/12* (2013.01); *F21V 23/001* (2013.01); *F21V 31/005* (2013.01); *H02G 15/013* (2013.01)

(58) Field of Classification Search
CPC ...... F21V 25/12; F21V 23/001; H02G 15/013
See application file for complete search history.

(56) References Cited

U.S. PATENT DOCUMENTS

| | | | | | |
|---|---|---|---|---|---|
| 4,156,893 | A * | 5/1979 | Baake | ................... | F21L 14/026 362/164 |
| 4,229,780 | A * | 10/1980 | Nelson | ................. | F21V 29/004 362/218 |
| 6,034,325 | A * | 3/2000 | Nattel | ...................... | H01R 9/03 174/59 |
| 6,514,346 | B1 * | 2/2003 | Nichols | ............... | B05B 13/0636 118/254 |

* cited by examiner

*Primary Examiner* — Anh Mai
*Assistant Examiner* — Zachary J Snyder
(74) *Attorney, Agent, or Firm* — Muncy, Geissler, Olds & Lowe, P.C.

(57) ABSTRACT

An explosion-proof lamp cable gland is disposed in a channel of a coupling portion of an explosion-proof lamp for a cable to pass through, and includes a first explosion-proof member disposed at one end of the channel remote from an opening of the coupling portion and a compact member disposed at another end of the channel close to the opening of the coupling portion to connect to the first explosion-proof member. The explosion-proof lamp cable gland of the invention thus formed is simpler in structure and smaller in size, and can achieve explosion-proof effect as a conventional connector that is bulkier in size. Thus not only the cost is lower, but serial connection among the explosion-proof lamps also can be accomplished easily to make application versatile.

4 Claims, 12 Drawing Sheets

EXPLOSION-PROOF LAMP CABLE GLAND

FIELD OF THE INVENTION

The present invention relates to an explosion-proof lamp cable gland and particularly to an explosion-proof lamp cable gland to facilitate serial connection and applications of explosion-proof lamps.

BACKGROUND OF THE INVENTION

Industrial locations such as chemical, petrochemical, oilfields, coalmines and the like often are scattered or stocked with gases, dust or chemicals that are inflammable, easily exploded or oxidized, or corrosive. Hence lamps used at those locations must be explosion-proof to avoid incidents of gas explosion or chemical explosion caused by sparks that might be generated by worn out or malfunctioned non explosion-proof lamps.

The wiring of conventional explosion-proof lamps generally has to use an extra explosion-proof cable gland tightly compacting with the cable to enhance air tightness. When connecting one or more explosion-proof lamps in series, an additional explosion-proof wiring box is needed to wire and install the explosion-proof lamps.

Hence installation of the conventional explosion-proof lamps might require extra wiring or using the explosion-proof cable gland and the wiring box. In order to improve explosion-proof effect the conventional explosion-proof cable gland often are made bulkier in size. As a result, the production cost of the cable gland is higher, installation with the explosion-proof lamp is more inconvenient, and applicability and versatility of the lamp sets are impaired. All this shows that there is still room for improvement.

SUMMARY OF THE INVENTION

The primary object of the present invention is to provide an explosion-proof lamp cable gland that is simpler in structure, smaller in size and can be applied to facilitate serial connection of explosion-proof lamps to make application versatile.

To achieve the foregoing object the present invention provides an explosion-proof lamp cable gland that is disposed in a channel of a coupling portion of an explosion-proof lamp for a cable to pass through. It comprises a first explosion-proof member disposed at one end of the channel remote from an opening of the coupling portion and a compact member disposed at another end of the channel close to the opening of the coupling portion to connect to the first explosion-proof member.

The invention, depending on different embodiments, can include a first accessory and/or a second accessory. The first accessory is coupled with the coupling portion, and the second accessory is disposed between the first accessory and the coupling portion of the explosion-proof lamp.

As a result, the explosion-proof lamp cable gland of the invention can provide many advantages, notably:

1. It can be directly coupled on a cable for use readily, and also provide great explosion-proof function.

2. Total size is smaller, hence is easier to make the explosion-proof lamps connect in serial or have more versatile applications.

3. Because of smaller in total size, it requires less material and is lower in cost.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Varying types of embodiments are elaborated below to facilitate discussion of the invention. It is to be noted that same element in different embodiments is marked by the same numeral. Moreover, the explosion-proof lamp cable gland 1 of the invention is disposed in a channel 23 of a coupling portion 21 of an explosion-proof lamp 2 for a cable L to pass through (referring to FIG. 1). The coupling portion 21 of the explosion-proof lamp 2 further includes an opening 22 formed on the surface thereof to communicate the channel 23 and the outside. The coupling portion 21 can be used to couple serially with another explosion-proof lamp or mount directly or indirectly onto a wall. The cable L passes through the opening 22 and the channel 23 to connect to an electric control module disposed in the explosion-proof lamp 2.

Figure 1:
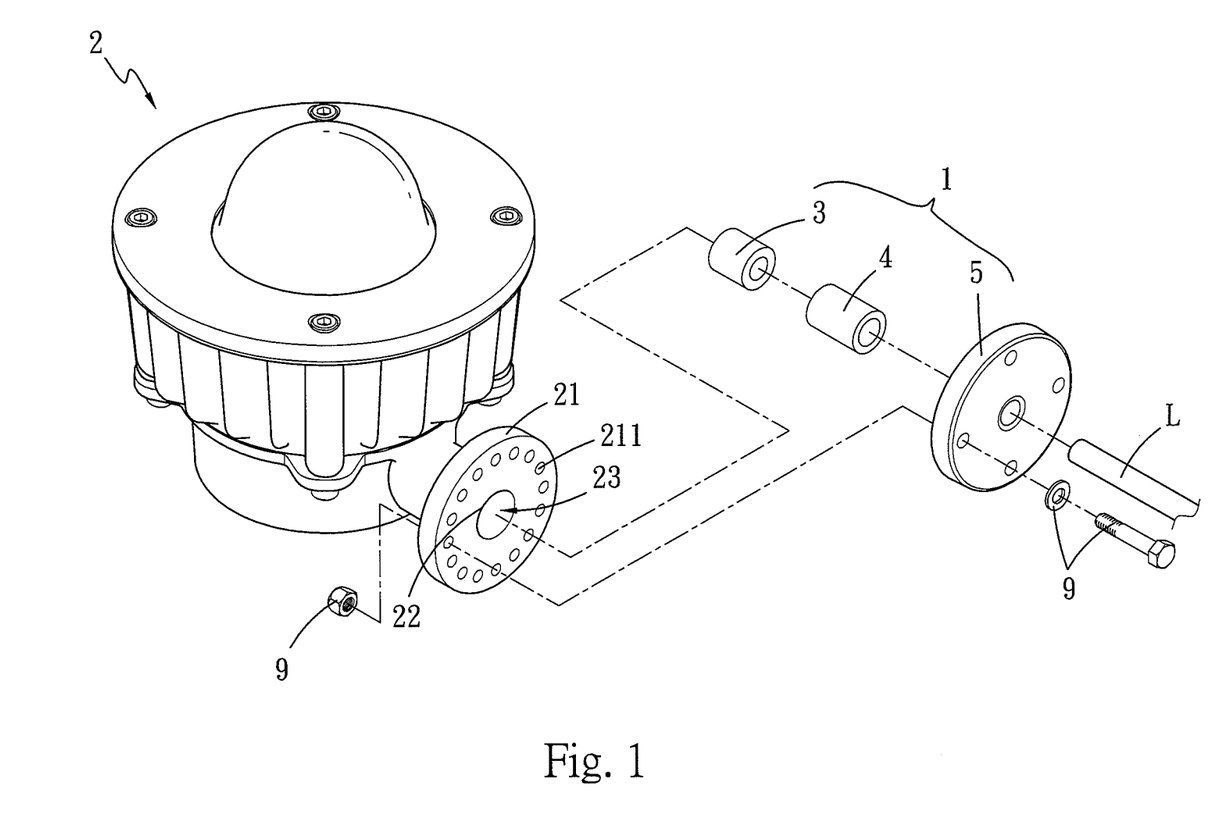
FIG. 1 is an exploded view of a first embodiment of the invention.
Figure 2A:
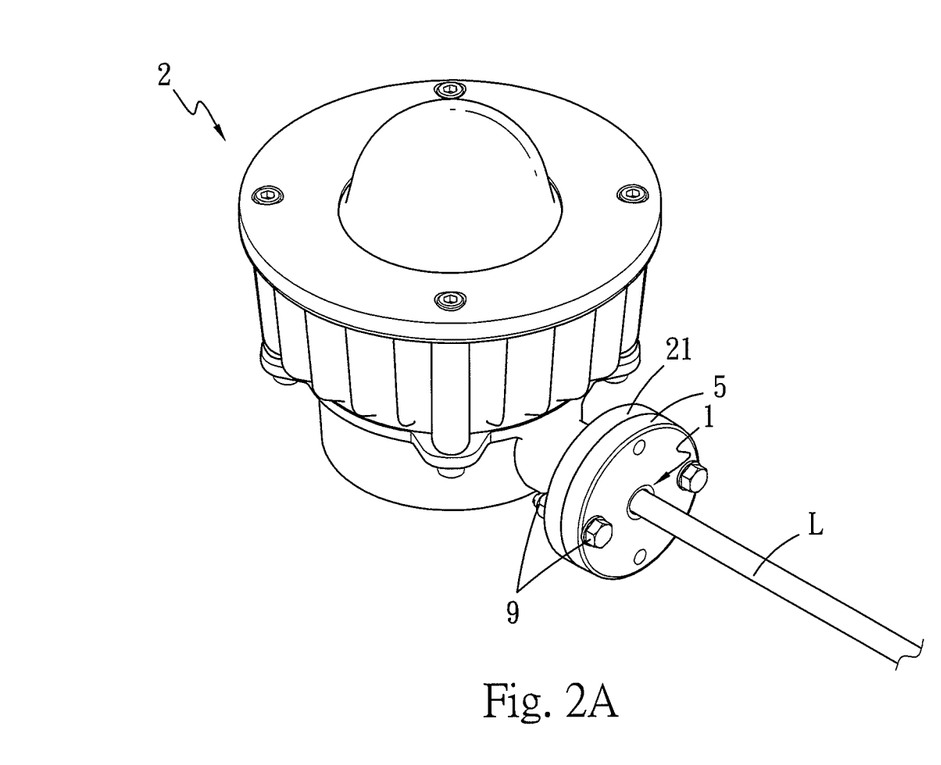
FIG. 2A is a perspective view of the first embodiment of the invention.
Figure 2B:
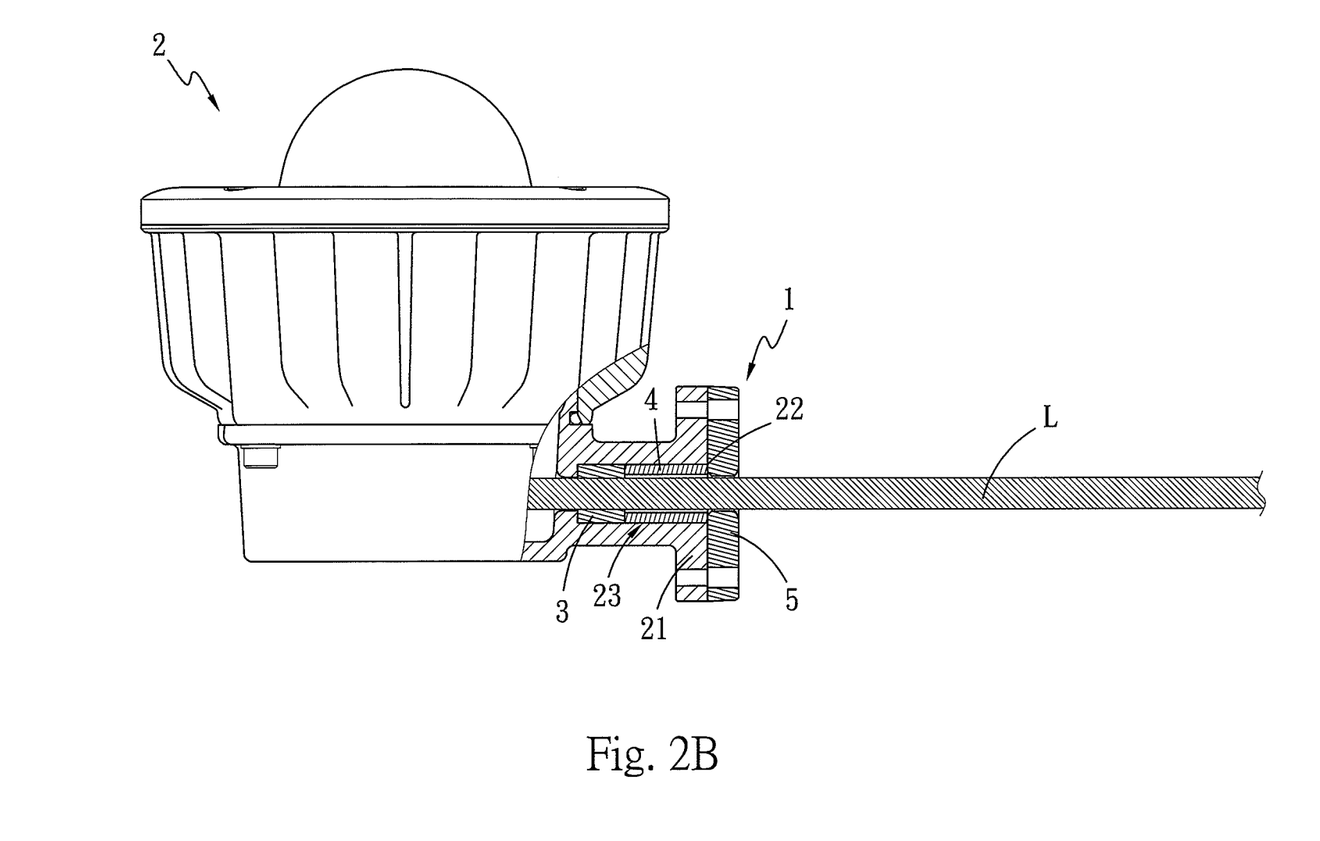
FIG. 2B is a partially sectional view of the first embodiment.

Please refer to FIGS. 1 through 2B for a first embodiment of the explosion-proof lamp cable gland 1 of the invention. The cable gland 1 includes a first explosion-proof member 3 and a compact member 4. The first explosion-proof member 3 is made of explosion-proof rubber. The compact member 4 is an aluminum tube, which is disposed in the channel 23 for the cable L to pass through. The first explosion-proof member 3 is disposed at one end of the channel 23 remote from the opening 22 of the coupling portion 21, wherein the first explosion-proof member 3 connects to the coupling portion 21 and the cable L passes through the first explosion-proof member 3. The first explosion-proof member 3 and the compact member 4 are formed in dimensions matching the channel 23 to form tightly compaction with the channel 23, thereby can attain desired air-tightness and liquid-tightness to achieve explosion-proof effect without using the conventional explosion-proof cable gland. The explosion-proof lamp cable gland 1 further includes a first accessory 5 which is implemented by a flange. The first accessory 5 can be fastened to the coupling portion 21 by using a plurality of fastening elements 9 to couple to a plurality of fastening holes 211 formed on the coupling portion 21. The first accessory 5 includes a through hole 51 and a protrusive portion 52 which is disposed in the through hole 51 annularly. The protrusive portion 52 is the radially inner portion of the first accessory which forms the outer surface of the through hole 51. The protrusive portion 52 has two axially arranged sections including a first section 511 having a first diameter and a second section 512 having a second diameter, wherein the second diameter is smaller than the first diameter.

Figure 3:
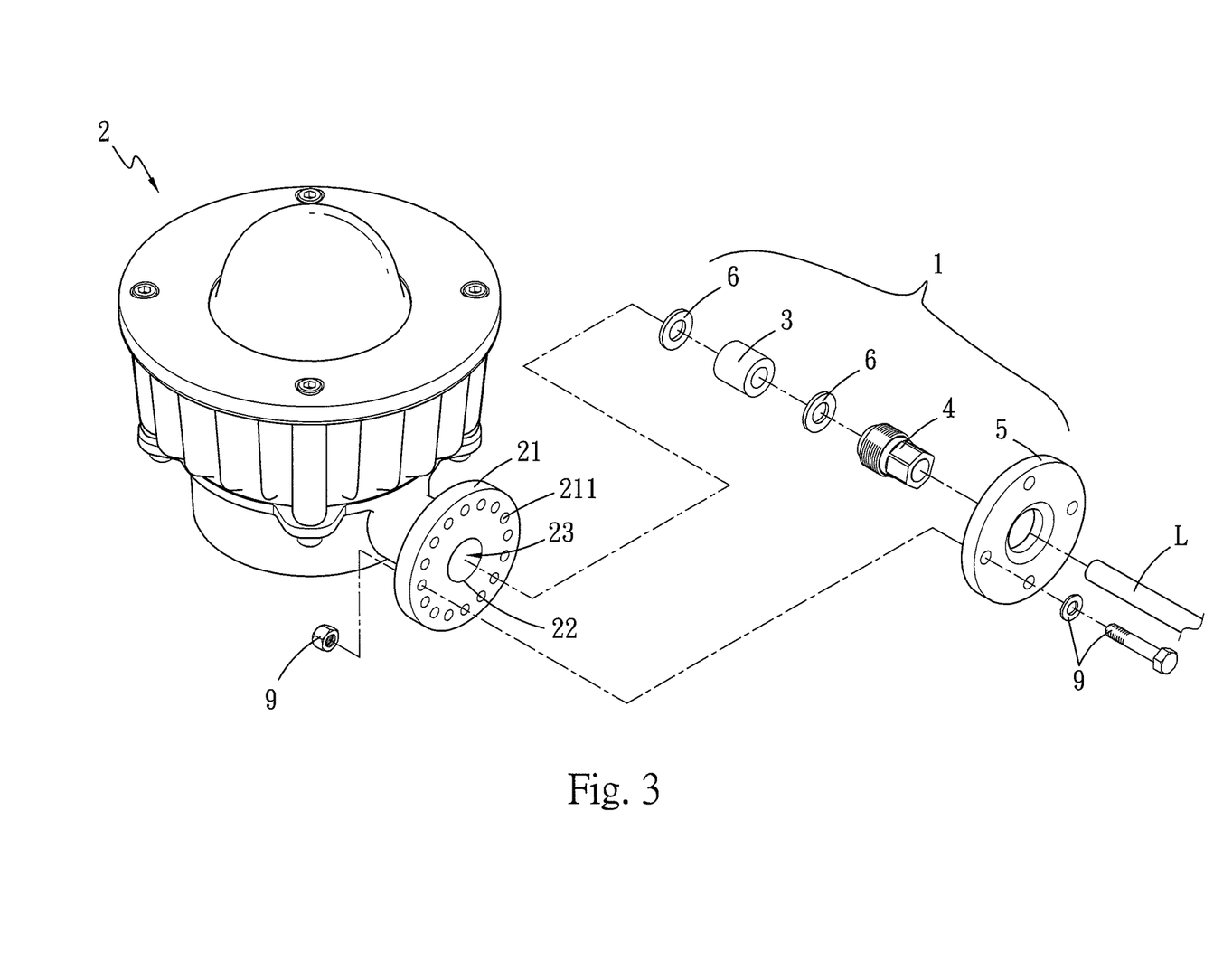
FIG. 3 is an exploded view of a second embodiment of the invention.
Figure 4A:
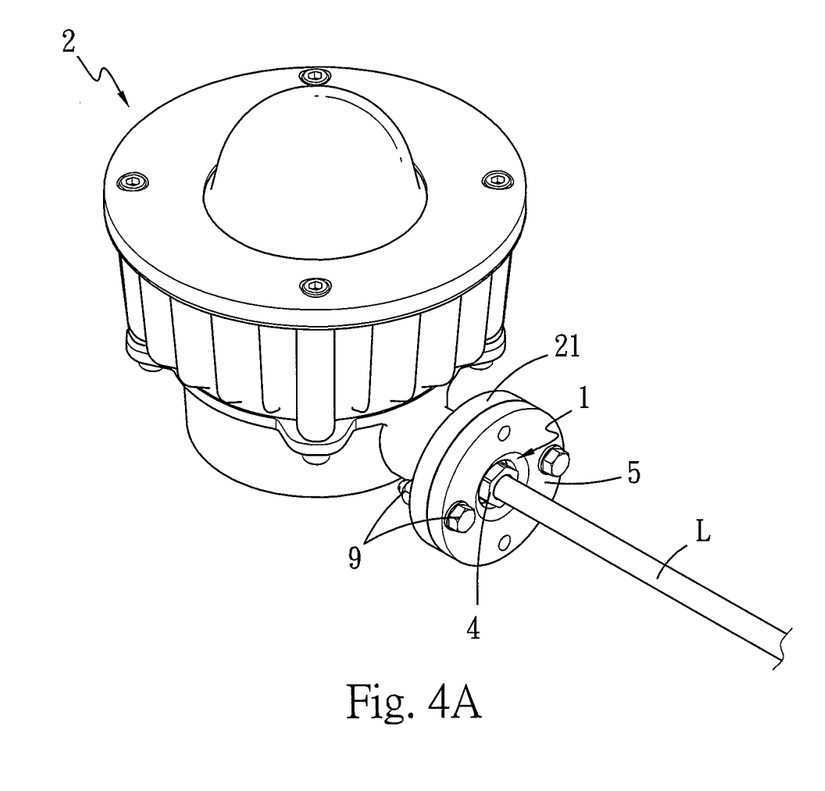
FIG. 4A is a perspective view of the second embodiment of the invention.
Figure 4B:
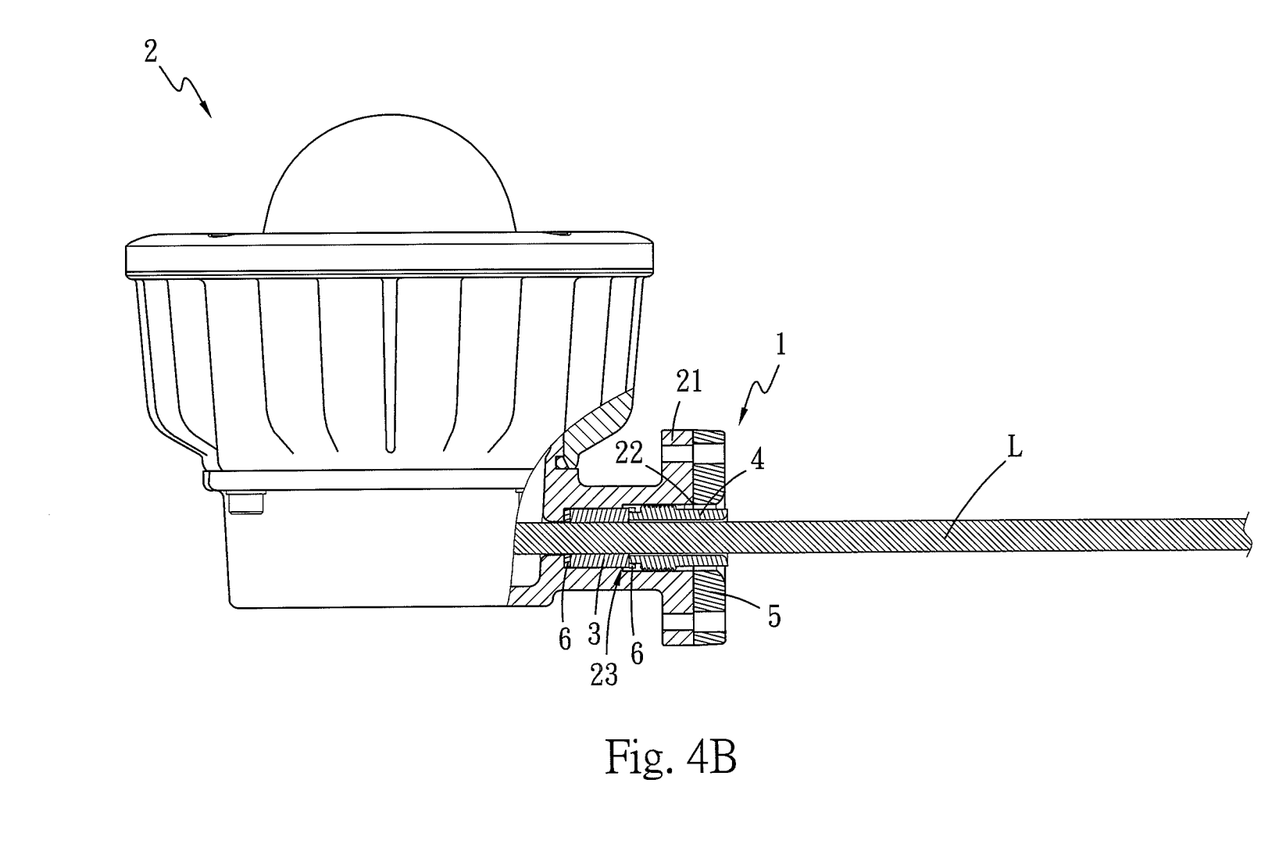
FIG. 4B is a partially sectional view of the second embodiment.

Please refer to FIGS. 3 through 4B for a second embodiment of the invention. The cable gland 1 of the second embodiment differs from the first embodiment by employing a rubber bolt as the compact member 4 instead of using the aluminum tube. Moreover, it further includes two gaskets 6 respectively disposed at two sides of the first explosion-proof member 3 to form tight compaction by connecting with the first explosion-member 3 and the compact member 4 in the channel 23. Thereby the explosion-proof lamp cable gland 1 of the second embodiment can provide even better explosion-proof effect, and can be used in a space where flammable or explosion-prone gases are stocked.

Figure 5:
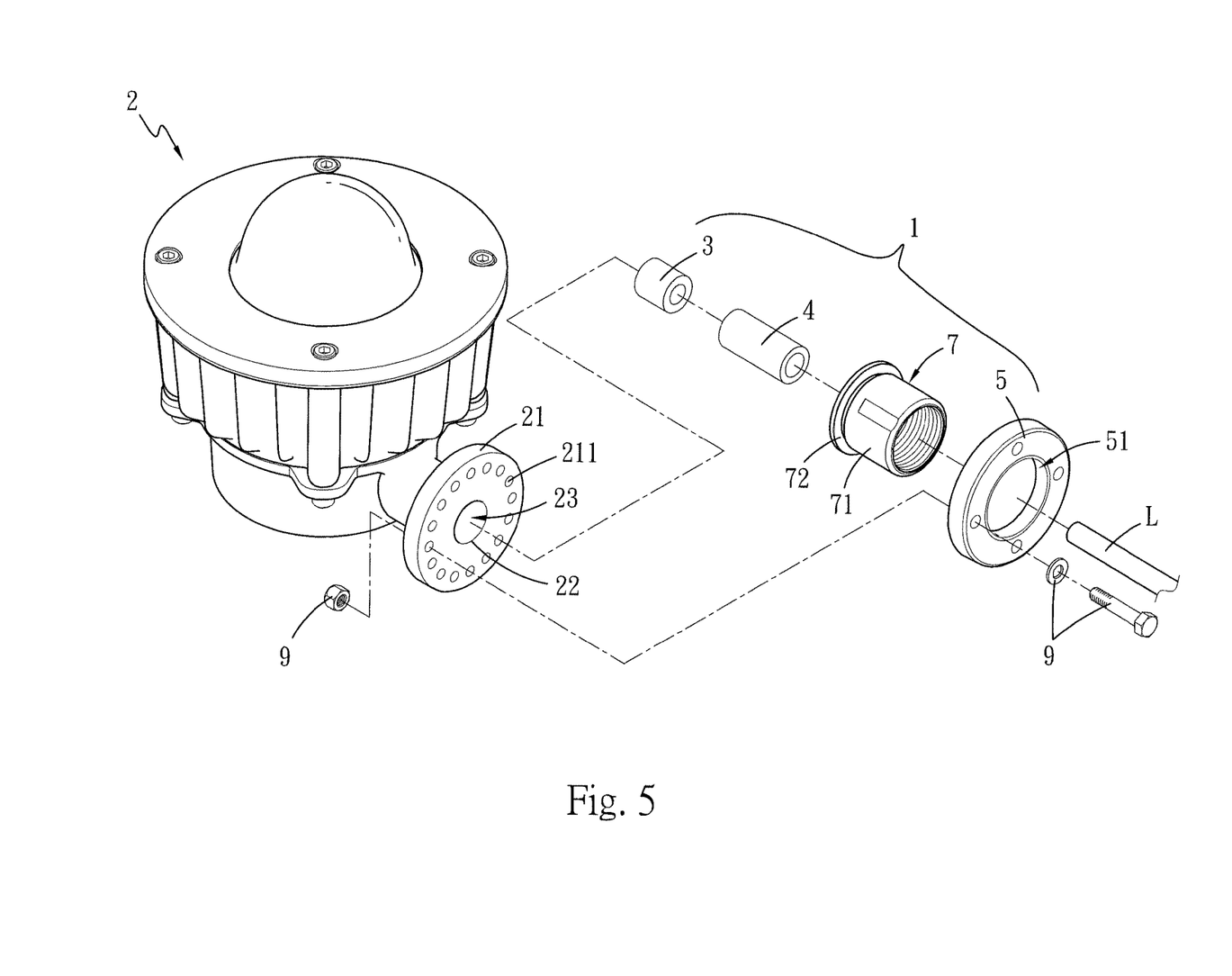
FIG. 5 is an exploded view of a third embodiment of the invention.
Figure 6A:
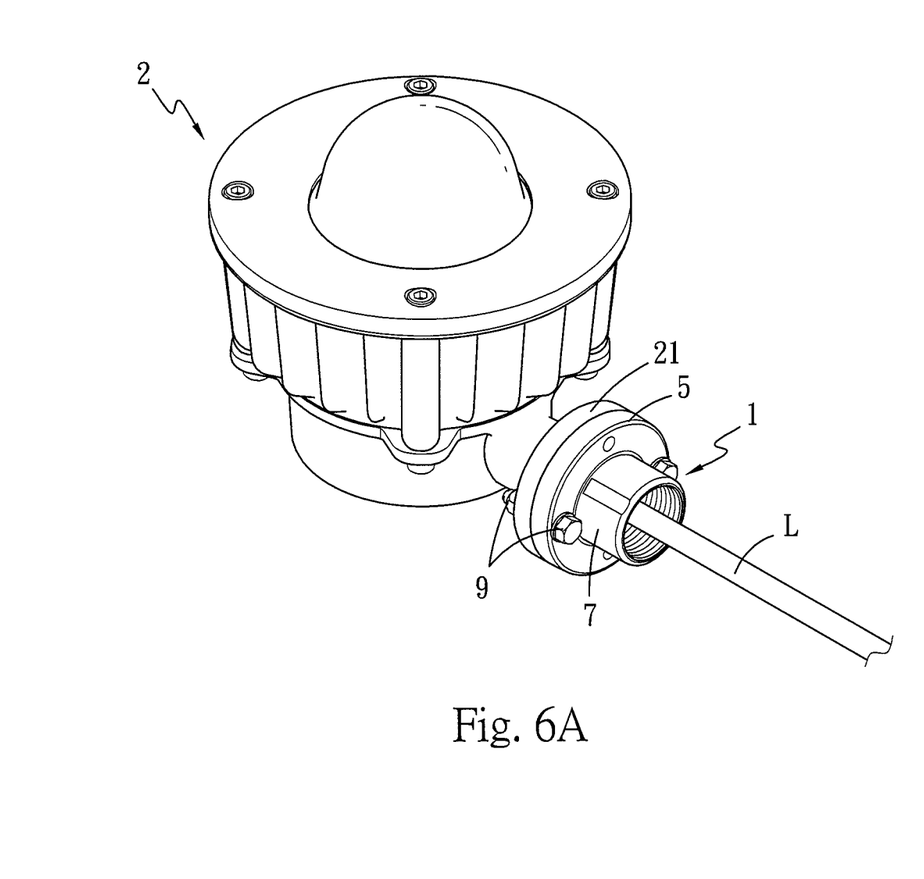
FIG. 6A is a perspective view of the third embodiment of the invention.
Figure 6B:
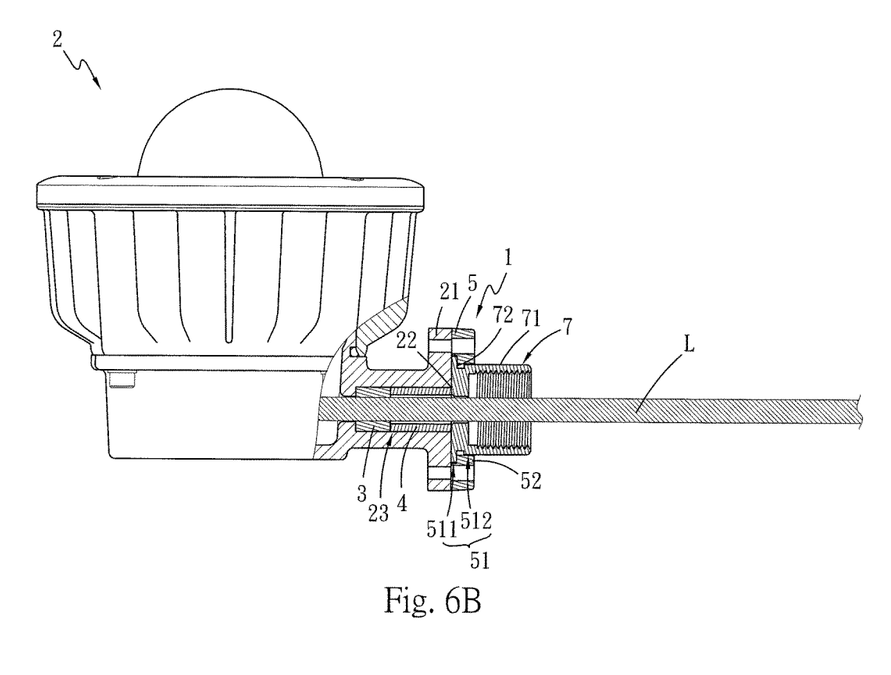
FIG. 6B is a partially sectional view of the third embodiment.

Please refer to FIGS. 5 through 6B for a third embodiment of the invention. The explosion-proof lamp cable gland 1 further includes a second accessory 7 implemented by a union. The second accessory 7 includes a through portion 71 run through the through hole 51 and through by the cable L, and a flange portion 72 disposed in the first section 511 and connected with the through portion 71, wherein the protrusive portion 52 and the coupling portion 21 clamp the flange portion 72 to restrict the displacement of the through portion 71. The second accessory 7 includes a through portion 71 run through the through hole 51 and through by the cable L, and a flange portion 72 disposed in the first section 511 and connected with the through portion 71, wherein the protrusive portion 52 and the coupling portion 21 clamp the flange portion 72 to restrict the displacement of the through portion 71. The second accessory 7 is disposed between the first accessory 5 and the coupling portion 21 and abuts the compact member 4 to compact the first explosion-proof member 3 and the compact member 4 in the opening 22. The first accessory member 5 also can be fastened to the coupling portion 21 of the explosion-proof lamp 2 via the plurality of fastening elements 9 to complete assembly. Through the second accessory 7, the third embodiment of the explosion-proof lamp cable gland 1 not only can provide explosion-proof effect, also can facilitate connection to other wiring tubes or brackets to achieve versatile applications.

Figure 7:
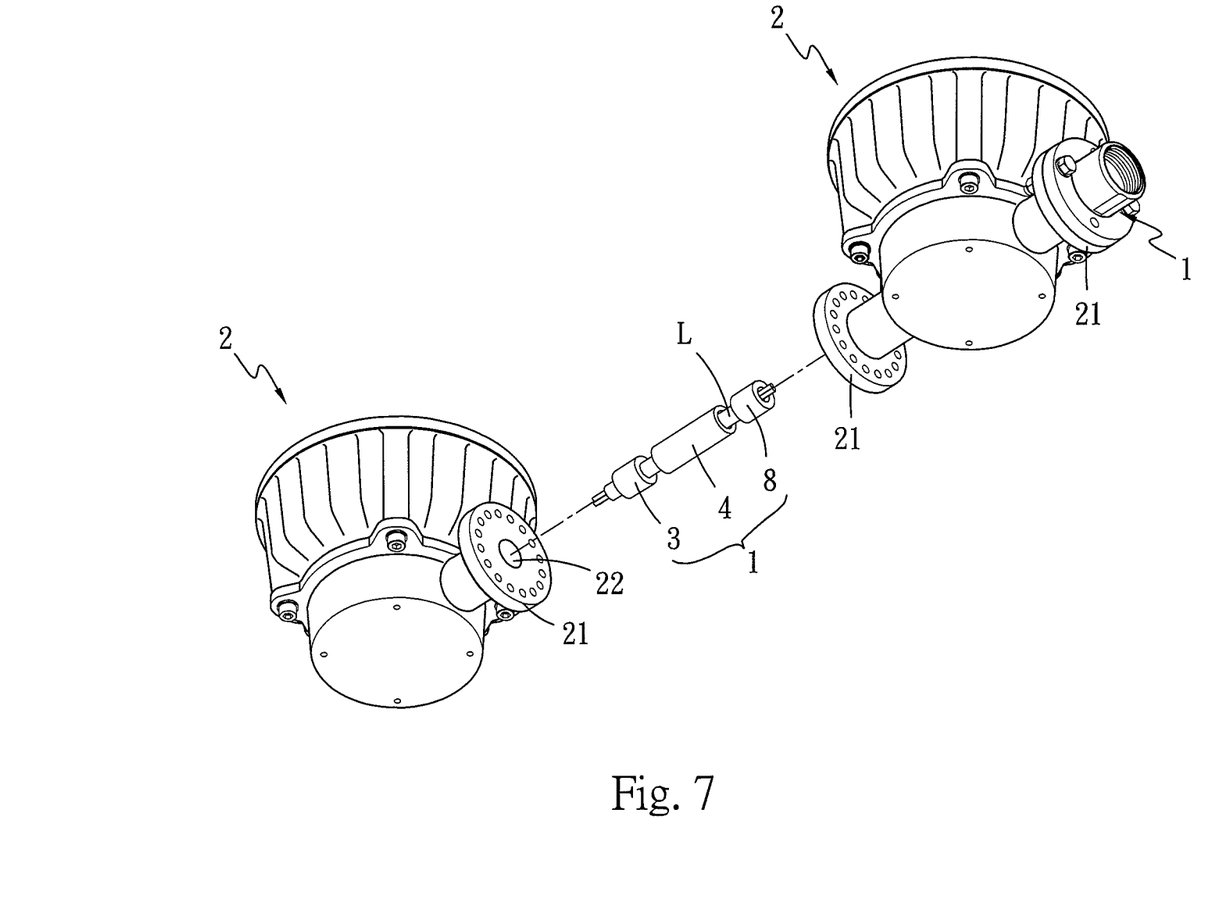
FIG. 7 is an exploded view of a fourth embodiment of the invention.

The structure of the invention, apart from adaptable to the individual explosion-proof lamp 2, also can be applied in two explosion-proof lamps 2 coupling together through two coupling portions 21 thereof, as shown in FIG. 7, which is a fourth embodiment of the invention. Comparing with the first embodiment, the cable gland 1 of the fourth embodiment further includes a second explosion-proof member 8 made of the explosion-proof rubber and disposed at one side of the compact member 4 opposite to the first explosion-proof member 3. It is to be noted that the compact member 4 in the fourth embodiment is an aluminum tube formed at a longer length to get desired tight compaction upon coupling. Thus, two ends of the explosion-proof lamp cable gland 1 of the fourth embodiment are respectively disposed in two channels 23 (not shown in the drawing) of the two explosion-proof lamps 2. Thus the two explosion-proof lamps 2 can be coupled head-to-head and provide desired explosion-proof effect.

Figure 8:
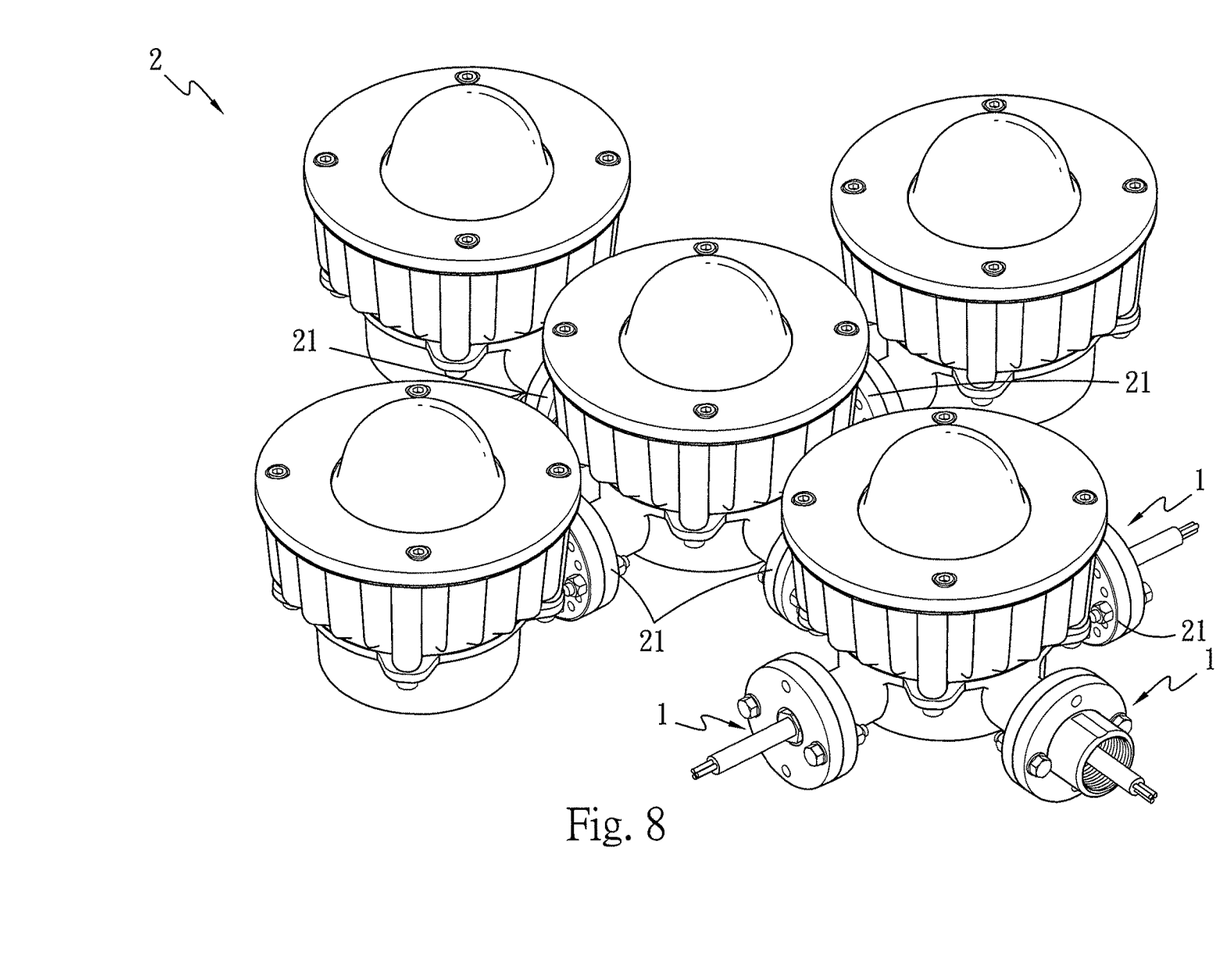
FIG. 8 is a schematic view showing different types of cable glands of the invention in a use condition for coupling a plurality of explosion-proof lamps.
Figure 9:
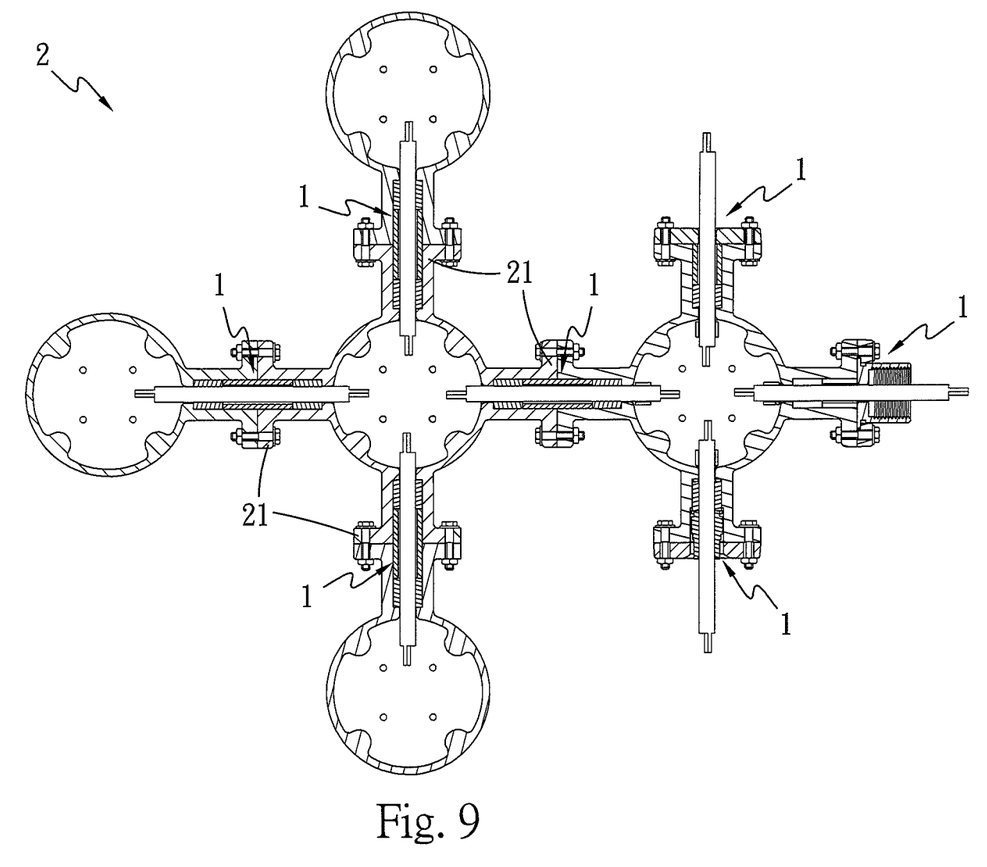
FIG. 9 is a sectional view according to FIG. 8.

Please referring to FIGS. 8 and 9, the explosion-proof lamp cable gland 1 compacted via a flange in the first embodiment, the explosion-proof lamp cable gland 1 equipped with a bolt in the second embodiment, the explosion-proof lamp cable gland 1 with an extra accessory in the third embodiment and the explosion-proof lamp cable gland 1 of the fourth embodiment can also be interconnected together. More specifically, the cable gland 1 of the fourth embodiment can be applied in the head-to-head connection of the two explosion-proof lamps 2, while other types of the cable glands 1 can be applied in the coupling portion 21 of other explosion-proof lamps 2, so that these explosion-proof lamps 2 can be connected and assembled and used via the various types of the explosion-proof lamp cable glands 1 of the invention.

As a conclusion, the explosion-proof lamp cable gland of the invention has a simpler and more compact structure and can achieve the explosion-proof effect that otherwise requires more bulky size in the conventional technique. The cost is lower, and serial connection among the explosion-proof lamps also can be accomplished easily to make application versatile.

What is claimed is:

1. An explosion-proof lamp cable gland disposed in a channel of a coupling portion of an explosion-proof lamp for a cable to pass through, comprising:
a compact member which is disposed in the channel for the cable to pass through;
a first explosion-proof member which is disposed at one end of the channel remote from an opening of the coupling portion;
a first accessory coupling with the coupling portion of the explosion-proof lamp, the first accessory including a through hole and a protrusive portion which is disposed in the through hole annularly, the protrusive portion dividing the through hole into a first section having a first diameter and a second section having a second diameter, wherein the second diameter is smaller than the first diameter; and
a second accessory including a through portion and a flange portion, wherein the through portion is positioned concentrically within the through hole, the cable is positioned concentrically within the through portion, and the flange portion is positioned in the first section and connected with the through portion and clamped by the protrusive portion and the coupling portion to restrict displacement.

2. The explosion-proof lamp cable gland of claim 1, wherein the first accessory is a flange.

3. The explosion-proof lamp cable gland of claim 1, wherein the second accessory is a union.

4. The explosion-proof lamp cable gland of claim 1, wherein the first explosion-proof member is an explosion-proof rubber and the compact member is a metal tube.

* * * * *